United States Patent [19]
Welker

[11] Patent Number: 4,586,760
[45] Date of Patent: May 6, 1986

[54] MEASURING SCALE CASING AND MOUNTING SPAR

[75] Inventor: Helmut Welker, Jamestown, N.Y.

[73] Assignee: Bausch & Lomb Incorporated, Rochester, N.Y.

[21] Appl. No.: 616,365

[22] Filed: Jun. 1, 1984

[51] Int. Cl.$^4$ .................... A47B 67/02; G01B 11/04
[52] U.S. Cl. ................................ 312/245; 312/111; 312/246; 250/237 G; 356/395
[58] Field of Search ............... 312/245, 246, 111, 195, 312/196, 223, 114, 123, 133, 188, 197, DIG. 33; 250/237 G; 356/395, 396; 238/349; 248/222.2, 225.1

[56] References Cited

U.S. PATENT DOCUMENTS

| | | | |
|---|---|---|---|
| Re. 29,281 | 6/1977 | Burns et al. ......................... | 356/395 |
| Re. 29,282 | 6/1977 | Burns et al. ......................... | 356/395 |
| 1,380,222 | 5/1921 | Lichtenberg ....................... | 312/246 |
| 2,426,712 | 9/1947 | Simpson .............................. | 312/297 |
| 3,297,377 | 1/1967 | Smith ................................... | 312/297 |
| 3,816,003 | 6/1974 | Litke ................................... | 356/395 |
| 3,833,303 | 9/1974 | Burns et al. ......................... | 356/395 |
| 4,031,595 | 6/1977 | Welker ............................ | 250/237 G |
| 4,140,356 | 2/1977 | Chervanak ......................... | 312/111 |
| 4,217,012 | 8/1980 | Klaus ................................... | 312/111 |

*Primary Examiner*—Victor N. Sakran
*Attorney, Agent, or Firm*—Toren, McGeady, Stanger, Goldberg & Kiel

[57] ABSTRACT

A measuring scale casing or housing and spar therefor. The spar comprises integral top and back walls. The back wall is provided proximate its lower end, with a lip extending in the same direction as the top wall. The internal surface of the lip has a groove.

The casing is provided with top, back and front walls and is provided with a downward protrusion proximate the bottom of the back wall. The protrusion is sized to fit within the groove of the lip of the spar in dovetail fashion when the exterior surface of the top wall of the casing is proximate the internal surface of the top wall of the spar and when the exterior surface of the back wall of the casing is flush against the internal surface of the back wall of the spar.

The top wall of the casing is provided with a V-shaped groove and the spar is provided with set screws in the top wall. The set screws can be screwed into the top wall to contact the surface of the side of the V-shaped groove which is closest to the back wall of the bracket to force the protrusion of the casing into the groove in the lip and to force the exterior surface of the back wall of the casing against the internal surface of the back wall of the spar.

5 Claims, 6 Drawing Figures

MEASURING SCALE CASING AND MOUNTING SPAR

BACKGROUND OF THE INVENTION (a) Field of the Invention

This invention relates to incremental distance measuring apparatus, particularly a scale casing or housing and a spar for holding and positioning the casing.

(b) History of the Prior Art

In high precision incremental distance measuring systems, such as illustrated in U.S. Pat. Nos. Re. 29,281, Re. 29,282 and 4,031,595an accurately ruled glass scale is supported along its length by a casing, typically an aluminum extrusion. Such glass scales have, as described in U.S. Pat. No. 4,031,595, 500 or more equal lines and spaces per inch. The instruments which incorporate such scales are, typically, accurate to from 0.0005 inches to 0.00005 inches.

In systems such as described above, it is important to insure the straightness of the glass scale. If straightness is not maintained, the distance along the surface of such a scale will vary, which will affect the accuracy of the measuring system. To minimize bending, a variety of apparatus and procedures are employed to secure the casing to, for instance, machine tools. In the system illustrated in U.S. Pat. No. 4,031,595, the casing is mounted to the table of a machine tool by a plurality of bolts spaced long the upstanding portion of the casing. In the system illustrated in U.S. Pat. No. Re. 29,282, the casing is secured to the machine tool via a dovetail. In other systems, the casing is fastened to the machine tool at its ends, or supported by one or more brackets, or a combination of both. Cement is also used to help secure the casing to a machine tool. However, as the length of scales and, hence, supporting casings has increased, and as product miniaturization has resulted in the reduction of the cross-sectional area of the casing, the problem of maintaining the straightness of the scale has increased.

Brackets used in the prior art for holding the casings have several disadvantages. For long casing lengths, they often do not provide enough support to maintain the straightness of the casing and, hence, the glass scale. In addition, brackets are often bulky, which either limits or prohibits their use in certain mounting situations. Additionally, brackets do not provide for protection of the sides and top of the casing.

BRIEF DESCRIPTION OF THE INVENTION

In accordance with the present invention, a casing and spar are provided which overcome the disadvantages previously discussed. The spar and casing of the present invention form a continuous rigid structure which insures that the casing, and the scale mounted therein, are held in straight alignment. The spar adds stiffness to the casing; permits easy removal of the casing without lateral sliding such as required by the dovetail alignment set forth in U.S. Pat. No. Re. 29,282; and permits the removal and installation of the casing without any realignment. The spar is easily adaptable to different mounting situations (i.e., mounting holes can be drilled in the spar, which could not be drilled in the casing, to match existing holes in the machine tool table). The spar also protects the casing against impact and shock, which hazards are always present in a machine shop environment; and permits the addition of a drip shield to further protect the casing from this environment. The invention requires minimum modification to the exterior configuration of the casing, and permits direct mounting of the casing to the machine tool in those situations where the casing length is short, or there is no room for the spar. Finally, the combination of spar with the casing makes the casing look massive and, hence, more psychologically acceptable, particularly for large machine tools.

The spar comprises integral top and back walls. The back wall is provided, proximate its lower end, with a lip extending in the same direction as the top wall. The internal surface of the lip has a groove.

The casing or housing has top, back and front walls and is provided with a downward protrusion proximate the bottom of the back wall. The protrusion is sized to fit within the groove provided on the spar in dovetail fashion when the exterior surface of the top wall of the casing is proximate the internal surface of the top wall of the spar and when the exterior surface of the back wall of the casing is "flush against" the internal surface of the back wall of the spar.

The top wall of the casing is provided with a V-shaped groove and the spar is provided with a series of set screws in the top wall. In operation, the set screws are screwed into contact with the surface of the side of the V shaped groove which is closest to the back wall of the spar to force the protrusion of the casing into the groove and to force the exterior surface of the back wall of the casing "flush against" the internal surface of the back wall of the spar.

"Flush against", as used herein, means that the surfaces contact each other at a sufficient number of points so that further pressure applied to force the surfaces together will not cause the surfaces to become substantially closer without undesirable non-linear deformation of the casing or spar.

BRIEF DESCRIPTION OF THE DRAWINGS

FIG. 9 is a perspective view of the spar and casing of the invention.

DETAILED DESCRIPTION OF THE INVENTION

In the preferred embodiment, the spar is an aluminum extrusion with a cross-sectional shape of an inverted L. The top and back walls may, however, have initially been separate pieces which are integrally held together, for example, by fasteners, welding or adhesives. Also, materials other than aluminum may be used. In all cases, the material thickness must be sufficient to provide dimensional stability to the spar when it is properly installed against, for instance, the flat edge of a machine tool table. The internal surface of the back wall of the spar is the surface toward the base of the L and the internal surface of the top wall is the surface toward the leg of the L.

The top, back and front walls of the casing are also attached to and integral with each other. The casing is preferably of aluminum, formed by extrusion. The back, top and front walls form a shape approximating an inverted U. The internal surfaces of the walls of the casing are the surfaces on the inside of the U shape and the exterior surfaces are the surfaces on the outside of the U shape. The material of construction and thickness of the walls of the casing are selected to protect the interior of the casing and to provide, in conjunction with the spar, the advantages previously set forth.

When the casing is assembled into the spar, a drip cover may be provided to protect not only the outside wall of the casing, but also the reading head support housing. Such a drip cover is usually suspended from the top wall of the spar to cover the casing outside wall but may cover the top wall of the casing and bend over the corner of the casing formed by the top and front walls of the casing to also cover the casing front wall. In such a case, the drip cover may be retained by the same set screws which secure the casing into the spar.

The casing is usually also provided with end walls which contact with and seal the ends of the casing. The bottom of the casing is usually sealed by strips of resilient, flexible material which allows access to the inside of the casing for the reading head or transducer support housing, such as illustrated in U.S. Pat. No. 4,031,595.

Figure 1:
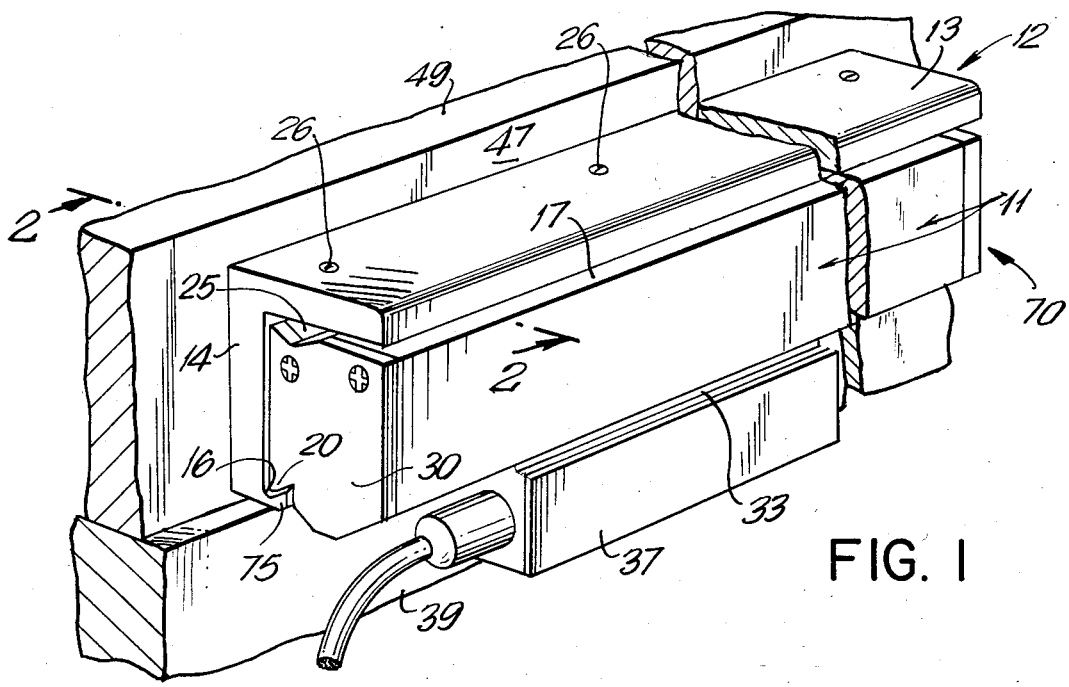

For a better understanding of the invention, reference may be had to the drawings which illustrate preferred embodiments of the invention but are not intended to limit the invention. FIG. 1 shows an article 10 comprising a casing 11 and a spar 12. The spar 12 comprises integral top wall 13 and back wall 14. Back wall 14 is provided, proximate its lower end, with a lip 15 extending in the same direction as top wall 13. The internal surface of lip 15 is provided with a groove 16. Back wall 14 is provided with a plurality of suitably located mounting holes 41, which permit bolts such as illustrated at 43 to hold exterior surface 45 in engagement with edge surface 47 of, for instance, machine table 49. Top wall 13 is provided with a series of set screws 26.

The casing 11 is provided with a top wall 17, a back wall 18 and a front wall 19. The top wall 17 of the casing 11 is provided with a V-shaped groove 25. The casing 11 is provided with a downward protrusion 20 proximate the bottom of back wall 18. Protrusion 20 is sized to fit into groove 16 of lip 15 of spar 12 when the exterior surface 21 of top wall 17 is proximate internal surface 22 of top wall 13 of bracket 12 and when exterior surface 23 of the back wall 18 of the casing is flush against internal surface 24 of back wall 14 of spar 12. The set screws 26 provided in top wall 13 of the spar are screwed into contact with the surface of the side of the V-shaped groove 25 which is close to the back wall of the spar to force the protrusion 20 of the casing into groove 16 and to force the exterior surface of the back wall of the casing "flush against" the internal surface of the back wall of the spar.

Casing 11 is usually provided with end walls 30 which contact and seal the ends of casing 11. The bottom of casing 11 is usually sealed by strips of resilient material 31 which are retained in circular grooves 32 in front wall 19 and back wall 18.

Figure 2:
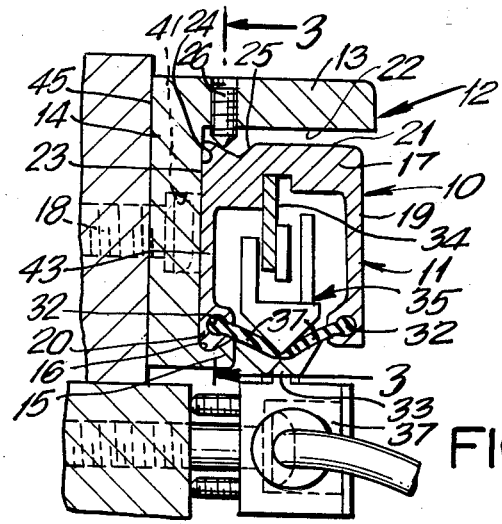
FIG. 2 is a cross-sectional end view of the spar and casing taken on line 2—2 of FIG. 1.
Figure 3:
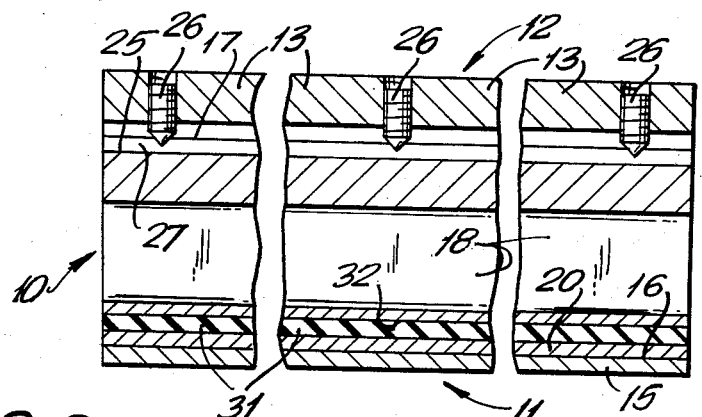
FIG. 3 is a cross-sectional front view of the spar and casing taken on line 3—3 of FIG. 2.

The casing 11 holds a scale 34 on which rides reading head 35. Reading head 35 is biased into engagement by a spring (not shown) which is secured to transducer support housing 37. Transducer support housing is secured to, for instance, machine table 39 as illustrated in FIG. 2 and as set forth in U.S. Pat. Nos. Re. 28,291 and Re. 28,292.

Figure 4:
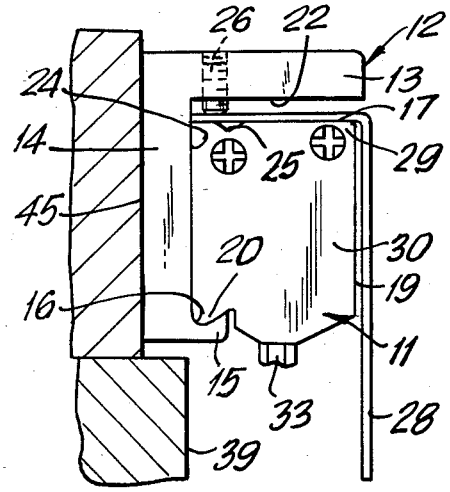
FIGS. 4–6 are end views of the spar and casing showing alternative embodiments of drip shields to protect the casing.
Figure 5:
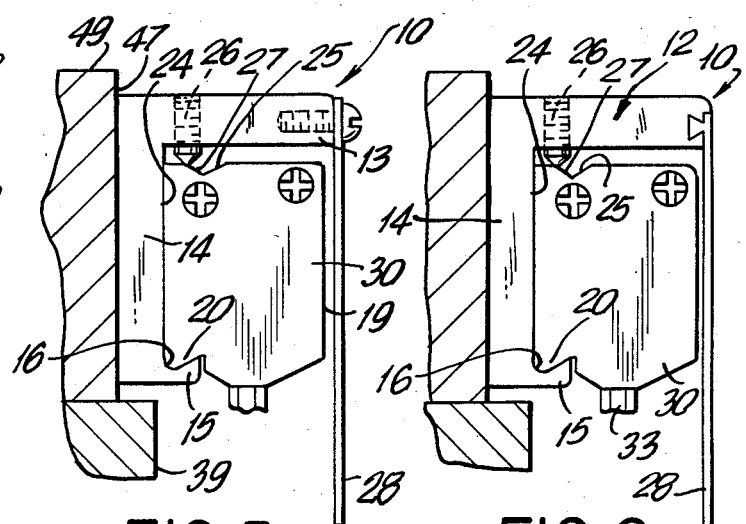
Figure 6:
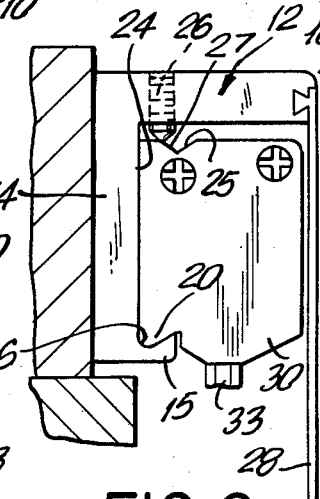

Drip cover 28 may be provided to protect casing 11, lip seals 31 and transducer support housing 37 from oil, cuttings and dust present in a machine tool environment. Drip cover 28 may be suspended from top wall 13 of bracket 12 to cover front wall 19 as shown in FIGS. 5 and 6 or may be retained against top wall 17 of casing 11 by set screws 26 and folded over corner 29 to cover front wall 19 as shown in FIG. 4.

Whereas the drawings and accompanying description have shown and described a preferred embodiment of the present invention it should be apparent to those skilled in the art that various changes may be made in the form of the invention without affecting the scope thereof.

What I claim is:

1. An article comprising a casing and spar therefor, said spar comprising integral top and back walls, said back wall being provided, proximate its lower end, with a lip extending in the same direction as said top wall, the internal surface of said lip having a groove, said casing being provided with top, back and front walls, and being provided with a downward protrusion proximate the bottom of said back wall, said protrusion being sized to fit within said groove of said lip of said spar when the exterior surface of the back wall of the casing is flush against the internal surface of the back wall of said spar, said top wall of said casing being provided with a V-shaped groove and said spar being provided with screws in its top wall which can be screwed in to contact the surface of the side of the V-shaped groove which is closest to the back wall of said spar to force said protrusion into said groove in said lip and to force the exterior surface of said back wall of said casing against the internal surface of the back wall of said spar.

2. The article of claim 1 wherein a drip cover is provided to cover the front wall of said casing.

3. The article of claim 2 wherein said drip cover is suspended from the top wall of the spar to cover the front wall of the casing.

4. The article of claim 2 wherein said drip cover is retained against the top wall of the casing by said screws and folds at the corner of the casing formed by the top and front wall of the casing to cover said front wall of the casing.

5. A spar for supporting and positioning a casing containing a scale, said spar comprising top and back walls, said back wall having an interior surface and a lip, said lip having a groove adapted to receive a mating protrustion provided on said casing, said top wall providing a protective cover for said casing and including a series of set screws arranged in a line substantially parallel with said groove, said set screw adapted to engage the surface of the V-shaped groove in the top wall of the casing provided on said casing and exerting a force on said surface to force said protrusion into engagement with said groove and an external surface of said casing into engagement with said exterior surface.

* * * * *